United States Patent [19]

Logie

[11] 4,313,139

[45] Jan. 26, 1982

[54] CARRIER RECOVERY CIRCUIT FOR A FACSIMILE SYSTEM

[75] Inventor: James A. Logie, Orlando, Fla.

[73] Assignee: Exxon Research & Engineering Co., Florham Park, N.J.

[21] Appl. No.: 120,486

[22] Filed: Feb. 11, 1980

[51] Int. Cl.³ .............................................. H04M 1/40
[52] U.S. Cl. ...................................... 358/281; 375/97; 455/265; 331/18
[58] Field of Search .............. 455/201, 202, 260, 265; 375/77, 97, 43; 358/281, 280; 331/1 A, 17, 18

[56] References Cited

U.S. PATENT DOCUMENTS

| | | | |
|---|---|---|---|
| 3,573,649 | 4/1971 | West | 331/17 |
| 3,821,658 | 6/1974 | Hoeft | 331/17 |
| 3,903,482 | 9/1975 | Pausini et al. | 331/17 |
| 4,099,125 | 7/1978 | Bennett, Jr. et al. | 455/265 |

*Primary Examiner*—Robert L. Richardson
*Assistant Examiner*—Edward L. Coles

*Attorney, Agent, or Firm*—Norman L. Norris; Dale M. Heist

[57] ABSTRACT

A receiver for a facsimile system in which a local carrier is either derived from a modulated signal or is generated when the carrier component of that signal is not detectable which employs a first variable frequency oscillator and a second variable frequency oscillator responsive to the first variable frequency oscillator for reducing the frequency variation of the local carrier in response to the first variable frequency oscillator. In the preferred embodiment, the second variable frequency oscillator which is frequency controlled while the first variable frequency oscillator is voltage controlled. The frequency controlled variable frequency oscillator preferably includes a stable clock driving one counter and a second counter being driven by the output frequency of the first oscillator. The respective counter states are compared in a comparator and the local generated carrier frequency is the frequency at the counts of the first counter equal the count of the second counter as determined by the comparator.

7 Claims, 2 Drawing Figures

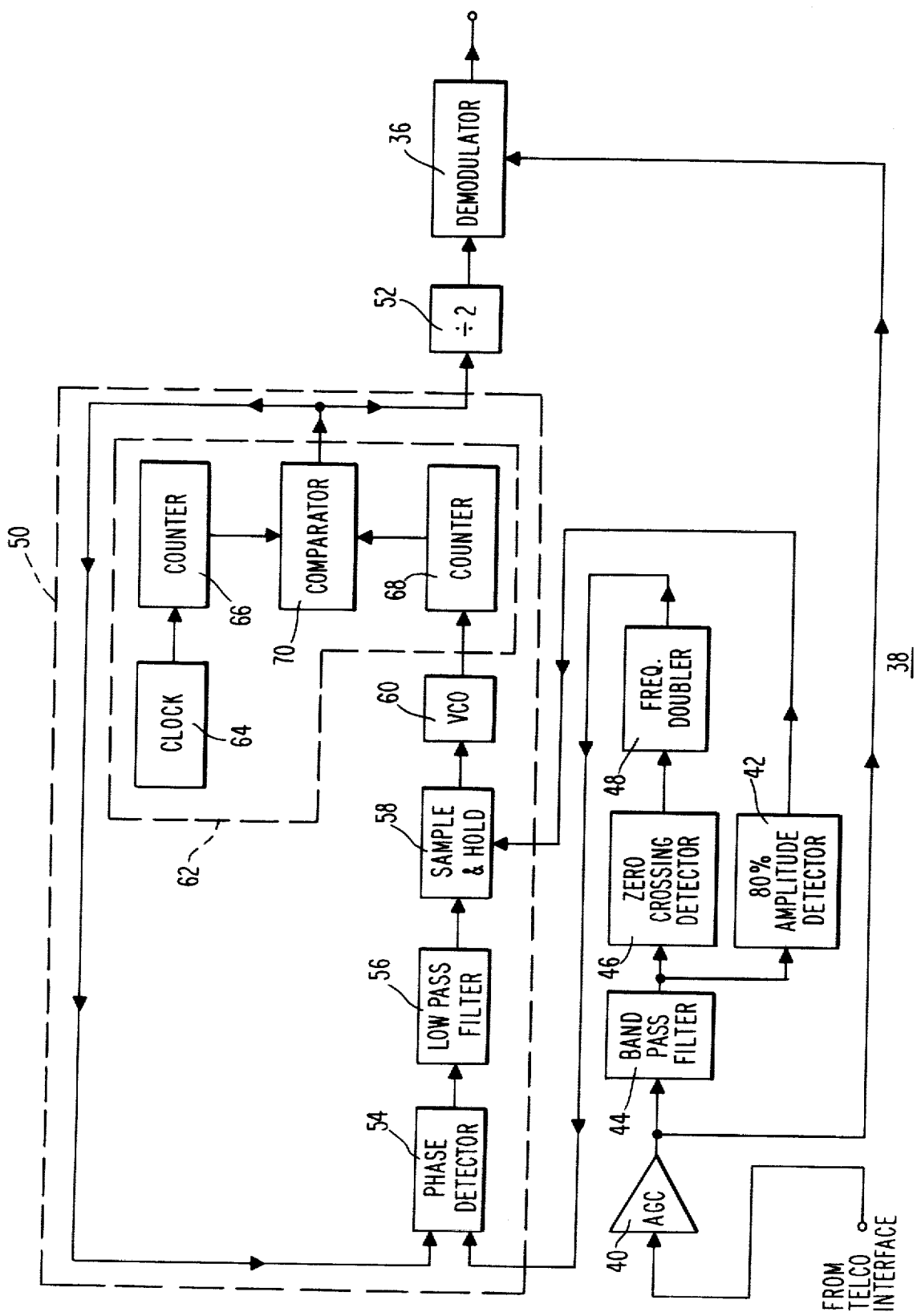

CARRIER RECOVERY CIRCUIT FOR A FACSIMILE SYSTEM

BACKGROUND OF THE INVENTION

This invention relates in general to a facsimile transceiver and in particular it relates to a novel carrier recovery circuit for use in such a transceiver.

Facsimile systems are devices wherein the dark/light variations in a document are sensed by a transmitter having an optical reading means. Signals emanating from the reading means are then amplitude modulated on a carrier and transmitted to a receiver at a remote location. There, the signals are demodulated and the demodulated signals are applied to a writing means which reproduces the dark/light variations on a document.

In the modulation scheme commonly employed, a carrier frequency is mixed with a video signal at the transmitter and the lower sideband of the modulated product is transmitted. At the receiver, a local carrier is used to demodulate the incoming signal. The local carrier is either derived from the incoming signal when the carrier component of that signal is detectable or is generated locally when the incoming signal carrier component is not detectable by a carrier recovery circuit. The demodulated output is the difference frequency (lower sideband) produced by product of the local carrier and the modulated incoming signal.

The derivation and generation of the local carrier at a facsimmile receiver from the modulated incoming signal is a difficult problem. At the transmitter, the product of the carrier frequency and the video signal is transmitted as a vestigial side band signal. In order to conserve band width, the higher frequency side band is normally filtered from the modulated signal leaving only the lower frequency side band for transmission. While this approach conserves band width, it has the undesired effect of also reducing the carrier frequency amplitude by as much as fifty percent, thus making it difficult to detect the transmitted carrier frequency at the receiver and therefore making it difficult to derive a local carrier therefrom. Moreover, when the transmitted carrier is not detectable, it is impossible to derive it from the incoming modulated signal and it must be generated at the same frequency and phase as the last detectable carrier signal. In the transmission scheme commonly employed, dark areas of the document are represented by an amplitude of zero in which case there is little or no carrier transmitted. Also, during times when the transmitted video signal has the highest frequency content resulting from fine scanned document detail, a frequency halving technique is employed which greatly suppresses the transmission of carrier. Thus, after periods of extensive black transmission or fine document detail transmission, the prior art techniques of generating the local carrier have suffered from the difficulty of phase and frequency variation such that when black transmission has ceased and the detection of an incoming carrier signal is resumed, the local carrier derived therefrom is substantially out of phase with that which had been generated at the receiver during the black transmission.

OBJECTS OF THE INVENTION

It is an object of the present invention to provide a carrier recovery circuit for use in the receiver of a facsimile system having a means for generating an extremely stable local carrier frequency even after long periods of black transmission where little or no transmitted carrier frequency is detectable.

It is a still further object of the present invention to provide a novel carrier recovery circuit for the receiver of a facsimile system having a means for generating an extremely stable local carrier frequency even when the amplitude of the transmitted carrier signal is minimized.

These and other objects of the present invention are realized by the improvement of a known prior art carrier recovery circuit including a first oscillator means comprising a voltage controlled oscillator wherein the improvement is the employment of a means responsive to this first oscillator for reducing frequency variations of the output thereof and therefore of the generated local carrier. This means for reducing the frequency variation of the first oscillator means comprises a second variable frequency oscillator which is frequency controlled. In the preferred embodiment of the present invention, the second variable frequency oscillator comprises a clock means, the frequency of which is substantially greater than the transmitted carrier of the modulated signal, a first counter responsive to the clock means and a second counter, responsive to the first variable frequency oscillator. Also provided is a comparator responsive to both the first and second counters, the local carrier being the output of the comparator. As will be more fully explained below, the effect of large and rapid variations in the frequency output of the first oscillator means upon the local carrier frequency stability are reduced, thus insuring that the local carrier remains equal in phase and frequency to the carrier frequency of the modulated signal even after long periods of black transmission.

DESCRIPTION OF THE DRAWINGS

The present invention will be more fully described by reference to the accompanying drawing in which:

FIG. 2 is a schematic circuit diagram of the facsimile transceiver of the present invention.

DESCRIPTION OF THE PREFERRED EMBODIMENT

Figure 1:
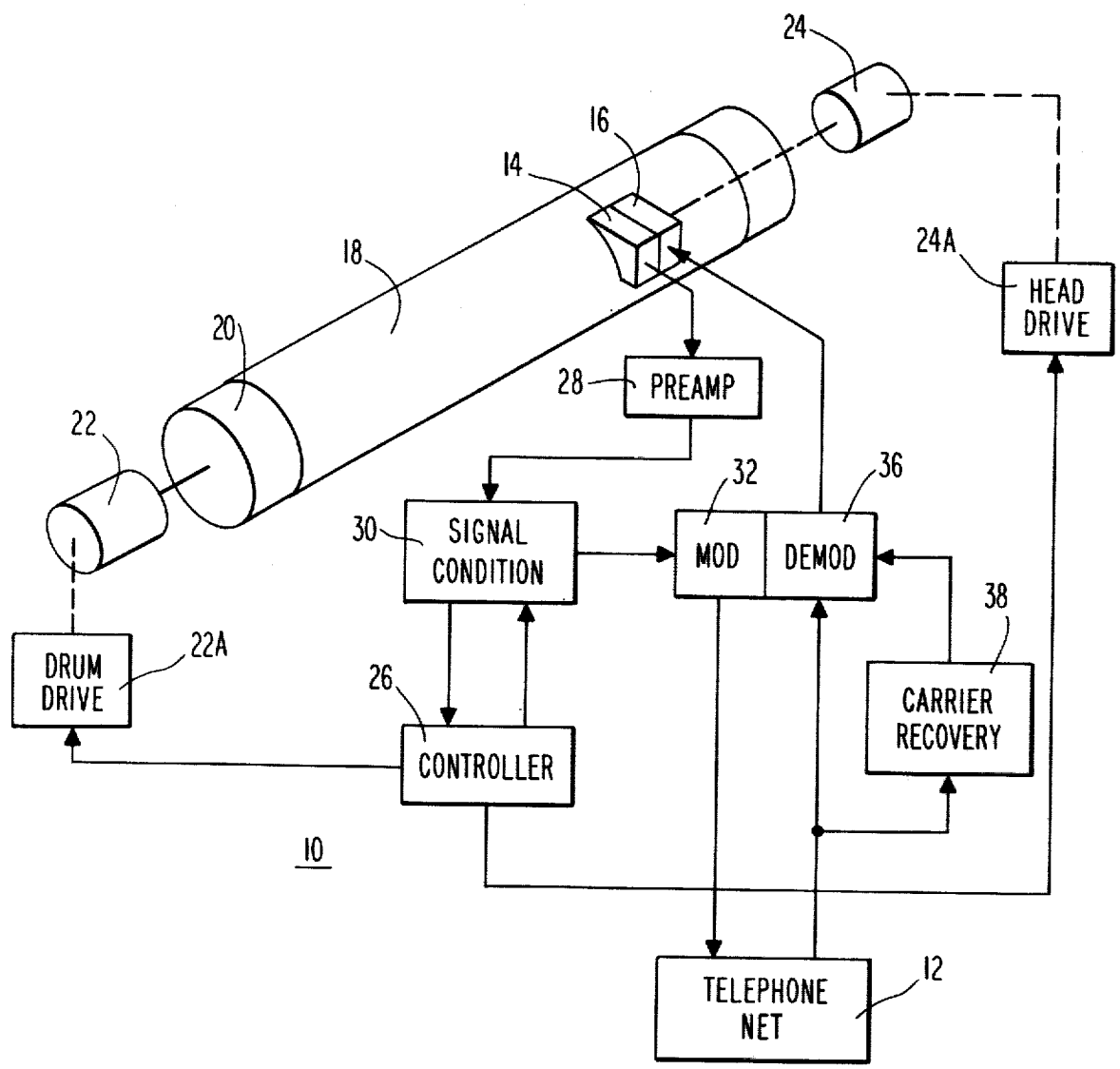
FIG. 1 is a schematic diagram of a facsimile transceiver of the type with which the present invention finds utility.

Referring to FIG. 1, a facsimile transceiver 10 is shown. The transceiver 10 is connected through an interface to the telephone network 12 and through the network to another remote transceiver [not shown]. Each transceiver 10 comprises a reading means 14 and a writing means 16 which scan a document 18. The document may be positioned upon a revolving drum 20. The drum is driven by a drum drive motor 22 controlled by drum drive circuit 22A. The document 18 can be positioned upon drum 20 and rotated past the reading means 14 and the writing means 16. The reading means 14 and the writing means 16 are also advanced along the axis of the drum 20 by the head drive motor 24 controlled by head drive circuit 24A. Both the drum drive circuit 22A and the head drive circuit 24A are controlled by microprocessor controller 26.

When the transceiver is in a transmit mode, video signals corresponding to light/dark variations upon the document 18 are detected by the reading means 14. Video signals are directed to a preamp 28, where they are amplified. The amplified signals are then directed to a signal conditioning circuit 30 and then modulated by the modulator 32 for transmission to a remote transceiver [not shown] through the telephone network 12.

When the transceiver is in a receive mode, incoming video signals from the telephone network 12 are first demodulated by demodulator circuit 36. At the demodulator 36, the incoming video signals are mixed with a carrier signal from carrier recovery circuit 38 which, is either derived from the transmitted carrier of the incoming signal when the carrier component of that signal is detectable or generated by the carrier recovery circuit 38 when the incoming carrier signal is not detectable. The demodulated output of demodulator 36 is directed to the writing means 16 where the demodulated signals are converted to light/dark variations on the paper 18 positioned on the rotating drum 20.

Referring now to FIG. 2, a carrier recovery circuit 38, improved in accordance with the present invention, will be described. Referring now to FIG. 2, a modulated signal containing the transmitted carrier frequency as well as video information is directed from the telephone interface to the automatic gain control circuit 40 and then to the demodulator circuit 36. This signal is also directed to carrier recovery circuit 38 via automatic gain control circuit 40. From the automatic gain control circuit 40, the modulated signal is directed to a plurality of means for detecting the transmitted carrier component of the incoming modulated signal. The means for detecting the transmitted carrier includes a band pass filter 44 which attenuates sideband frequencies but passes the carrier frequency component followed by an amplitude detector 42 and a frequency detector comprising a zero crossing detector 46. The band pass filter 44 is tuned to the carrier frequency of the transmitted carrier. According to the recommendation of the CCITT, the carrier frequency must range between 2084 and 2116 Hz, and in the preferred embodiment, the band pass filter 44 is tuned to this frequency range. The amplitude detector 42 provides an output when the amplitude of the modulated signal is greater than eighty percent of that which is expected. The zero crossing detector 46 provides a square wave output representative of the frequency of the transmitted carrier.

According to the preferred embodiment of the invention, the output of the zero crossing detector 46 is supplied to a frequency doubler circuit 48 inasmuch as the zero crossing detector provides one output level for the positive portion of the signal and a second level for the negative portion of the signal. The frequency doubler provides two levels of output for each positive portion and each negative portion of the signal with the sequence of the two levels beginning at either a positive going transition or a negative going transition of the signal. Thus, an identical output sequence is supplied from the frequency doubler following each positive-to-negative or negative-to-positive transition of the signal. According to a recommendation of the CCITT, the carrier phase of the transmitter output may be switched from 0 to 180 degrees at any time in response to action of the video frequency halving means. It should be noted that the output of the demodulator is identical in either case where the local carrier is in-phase with the signal carrier component of 180 degrees out-of-phase with the signal carrier component. Phase locking to the frequency doubler is performed at twice the recovered carrier frequency. The phase lock loop is thus unresponsive to sudden 180 degree phase changes in the carrier component of the signal since it locks on both the 0-degree and 180-degree points of the carrier signal waveform. Sudden 180 degree phase changes of the carrier component do not disturb the phase locking action of the carrier recovery circuit when the means just described are used.

The output of the frequency doubling circuit 48 is directed to a phase locked loop which is shown generally at 50. The output of the phase locked loop 50 is directed to a divider 52 which divides the input thereto by two which therefore negates the effect of the frequency doubler 48 to provide a local carrier with a frequency equal to the detected carrier. The output of the divider 52 is the local carrier signal which is directed to the demodulator 36.

As is typical of the prior art, the phase locked loop 50 includes a phase detector 54, a low pass filter 56, a sample and hold circuit 58, and a first variable frequency oscillator means 60. The first variable frequency oscillator means typically comprises a voltage controlled oscillator, the frequency of which is responsive to the voltage output of sample and hold circuit 58. The sample and hold circuit 58 is responsive to the amplitude detector 42 such that the output of the low pass filter 56 is supplied to the first oscillator means 60 when the transmitted carrier is detectable, i.e., when the carrier component amplitude of the modulated incoming signal exceeds eighty percent of the expected amplitude as determined by the amplitude detector 42. However, whenever the incoming modulated signal amplitude is less than eighty percent of the expected value as determined by the amplitude detector 42, the sample and hold circuit 58 provides a voltage equal to the output of low pass filter 56 prior to the drop in amplitude of the carrier component below 80% of its expected value. The output of the first variable oscillator means 60 in accordance with the prior art, was directed to the phase detector 54 so as to be phase locked with the incoming detected carrier signal.

However, as mentioned in the background of the invention of the present specification, the prior art technique described above suffered from the disadvantage that after extended periods of black transmission in which the transmitted carrier was not detectable at the receiver, the frequency output of the voltage controlled oscillator 60 tended to vary. It is believed that this variation was caused by the sensitivity of the first ocsillator means 60 to the input voltage and temperative changes and the consequential inability of sample and hold circuit 58 to retain a voltage proportional to the last detected transmitted carrier frequency for a substantial period of time. Accordingly, in accordance with the present invention, a means is provided which is responsive to the first variable frequency oscillator 60 for reducing the effect to the local carrier frequency of the frequency variation of the first oscillator means.

In accordance with the present invention, this means for reducing the frequency variation of the local carrier includes a second variable frequency oscillator 62 which is controlled over a very small range by the frequency of the first variable oscillator means 60.

In accordance with the preferred embodiment of the present invention, the frequency controlled variable frequency oscillator comprises a frequency stable clock means 64, a first counter 66 responsive to the clock means, a second counter 68 responsive to the first variable frequency oscillator 60 and a digital comparator 70 which compares the outputs of the first and second counters 66. The output of the comparator 70 is then directed to the divider circuit 62 and also coupled to the phase detector 54 for phase locking with the transmitted carrier.

In accordance with this preferred embodiment of the present invention, the clock means 64 comprises a crystal oscillator having a stable frequency, $F_1$, substantially greater than the carrier frequency of the modulated signal and substantially greater than the frequency of the first oscillator means 60. In the preferred embodiment, the clock has a frequency $F_1$ on the order of 2 MHz. The counter 66 and 68 are each chosen to have a maximum count, N, such that the expression $F_1/N$ is substantially equal to the maximum carrier frequency of the modulated carrier. In accordance with the recommendations of the CCITT the maximum carrier frequency may not exceed 2116 Hz and, accordingly, where $F_1$, the frequency of the clock 64, is equal to 2 MHz, N is chosen to be equal to 944.

Using this arrangement, the local carrier frequency which is generated during periods in which the transmitted carrier is not detectable, is the frequency at which the count of the first counter 66 equals or coincides with the count of the second counter 68. Since the second counter 68 advances at a rate proportional to the frequency output of the first oscillating means 60 and since the first counter 66 advances at a much higher rate, the first counter 66 will reach its maximum count N and will reset, much faster than will the second counter 68. When this maximum count of counter 66 is reached, the first counter 66 will reset and will, at some time, again coincide with the count of the second counter 68. If the frequency out-put of the first variable oscillator means 60 decreases, the time of coincidence between counter 66 and 68 will be decreased, thus insuring that the local carrier generated by the phase locked loop 50 will be proportionately increased. Moreover, if the frequency output of the first oscillator means 60 is increased, counter 68 will advance more rapidly and the time of coincidence between counter 66 and 68 will be increased thus insuring that the local carrier frequency generated by phase locked loop 50 will be decreased in this manner. The frequency controlled variable frequency oscillator 62 provides an efficient means for varying the frequency of the local carrier over a narrow range (2100±16 Hz) as the result of a change in frequency of the first oscillator means 60 over a much wider range. In fact, the range over which the second oscillator means 62 may vary is only 1/N that over which the first oscillator 60 may vary where N is the maximum count of counters 66 and 68.

While a particular embodiment of the present invention has been shown and described, it will, of course, be understood that various modifications can be made without departing from the principals of the invention. Dependent claims are, therefore, intended to cover any such modifications within the true spirit and scope of the invention.

What is claimed is:

1. In a receiver for a facsimile system in which a local carrier is either derived from the carrier component of a modulated signal or is generated when that component is not detectable of the type having:
   a means for detecting the transmitted carrier of said modulated signal;
   a first variable frequency oscillator means responsive to said detecting means, the frequency of which varies with and is phase locked in proportion with the frequency of said transmitted carrier when the transmitted carrier is detectable but which remains substantially constant and equal to the frequency of the last detected transmitted carrier when the transmitted carrier is no longer detectable, the improvement comprising:
   a means responsive to said first variable frequency oscillator for reducing the frequency variation of said local carrier.

2. The improvement of claim 1 wherein said means for reducing said frequency variation comprises:
   a second variable frequency oscillator.

3. The improvement of claim 2 wherein said first variable frequency oscillator is a voltage controlled oscillator, the input voltage of which is a function of the phase difference between said transmitted carrier and said local carrier and wherein said second variable frequency oscillator is a frequency controlled variable frequency oscillator, the input frequency of which is the output frequency of said first variable frequency oscillator.

4. The improvement of claim 3 wherein said second variable frequency oscillator comprises:
   a clock means, the frequency of which is substantially greater than the carrier frequency of said modulated signal and of said first oscillator means;
   a first counter responsive to said clock means;
   a second counter responsive to said first variable frequency oscillator; and
   a comparator responsive to both said first and said second counters, said local carrier being the output of said comparator.

5. The improvement of claim 4 wherein said local carrier frequency is the frequency at which the count of said first counter equals the count of said second counter as determined by said comparator.

6. The improvement of claim 5 wherein the maximum count of both said first and second counters is N, wherein the frequency of said clock means is $F_1$ and wherein the expression of $F_1/N$ is equal to the maximum frequency of said local carrier.

7. The circuit of claim 6 wherein the maximum carrier frequency of said local carrier is substantially equal to 2116 Hz.

* * * * *